(12) United States Patent
Pfahl et al.

(10) Patent No.: US 8,601,783 B2
(45) Date of Patent: Dec. 10, 2013

(54) INTERNAL RING SEALED CHAIN

(75) Inventors: Christopher Pfahl, Vermilion, OH (US);
Jeff Miller, Vickery, OH (US); Dick Virgo, Huron, OH (US)

(73) Assignee: U.S. Tsubaki, Inc., Wheeling, IL (US)

( * ) Notice: Subject to any disclaimer, the term of this patent is extended or adjusted under 35 U.S.C. 154(b) by 834 days.

(21) Appl. No.: 12/798,922

(22) Filed: Apr. 13, 2010

(65) Prior Publication Data

US 2011/0251004 A1 Oct. 13, 2011

(51) Int. Cl.
*F16G 13/06* (2006.01)
*B21L 9/02* (2006.01)

(52) U.S. Cl.
USPC .............................. 59/5; 59/4; 59/35.1; 59/78

(58) Field of Classification Search
USPC .............................................. 59/4, 5, 35.1, 78
See application file for complete search history.

(56) References Cited

U.S. PATENT DOCUMENTS

| | | | | |
|---|---|---|---|---|
| 2,061,223 A * | 11/1936 | Cunningham et al. | ........ | 305/106 |
| 2,764,031 A * | 9/1956 | Nystrom | ........ | 474/138 |
| 3,135,128 A | 6/1964 | Rudolph | | |
| 3,336,089 A * | 8/1967 | Krickler | ........ | 305/118 |
| 4,020,712 A * | 5/1977 | McKeon et al. | ........ | 474/231 |
| 4,464,151 A * | 8/1984 | Kahl | ........ | 474/231 |
| 4,729,754 A | 3/1988 | Thuerman | | |
| 4,863,418 A * | 9/1989 | Fillar et al. | ........ | 474/207 |
| 5,215,616 A * | 6/1993 | Fillar | ........ | 156/173 |
| 5,269,129 A * | 12/1993 | Lundy | ........ | 59/78 |
| 5,425,679 A | 6/1995 | Utz | | |
| 5,468,376 A * | 11/1995 | Bates | ........ | 210/160 |
| 5,787,700 A * | 8/1998 | Tanaka | ........ | 59/5 |
| 6,223,515 B1 * | 5/2001 | Koschig et al. | ........ | 59/4 |
| 7,467,509 B2 * | 12/2008 | Yamane et al. | ........ | 59/4 |
| 7,797,920 B2 * | 9/2010 | Wang | ........ | 59/7 |
| 7,909,718 B2 * | 3/2011 | Komeya | ........ | 474/206 |
| 8,069,805 B2 * | 12/2011 | De Baan et al. | ........ | 114/230.26 |
| 8,250,846 B2 * | 8/2012 | Soerensen | ........ | 59/78 |
| 2002/0062638 A1 * | 5/2002 | Bedford et al. | ........ | 59/7 |
| 2003/0101711 A1 * | 6/2003 | Yamamoto | ........ | 59/7 |
| 2003/0167618 A1 * | 9/2003 | Ino | ........ | 29/522.1 |
| 2004/0185978 A1 * | 9/2004 | Prince | ........ | 474/206 |
| 2010/0148575 A1 * | 6/2010 | Johannsen et al. | ........ | 305/201 |
| 2011/0195810 A1 * | 8/2011 | Perissinotto | ........ | 474/101 |

* cited by examiner

*Primary Examiner* — David B Jones
(74) *Attorney, Agent, or Firm* — James Creighton Wray

(57) ABSTRACT

Links in industrial chains are connected by pins in bushings. Internal sealing rings in internal annular grooves near ends of bushings prevent inward movement of debris and outward movement of grease past the grooves. Steel internal sealing rings are expanded further into the grooves upon insertion of the pins through the bushings and the steel rings. The steel rings tightly grip the pins and rotate with the pins. Opposite ends of the bushings extend slightly from inside sidebars. Outer conical nitrile seals have collars placed on extended ends of the bushings and have large radiused ends for contacting inner surfaces of outside sidebars that hold the pins.

20 Claims, 4 Drawing Sheets

INTERNAL RING SEALED CHAIN

BACKGROUND OF THE INVENTION

Bushings are assembled between inside sidebars, forming blocks or bushing links. Pins are extended through outside sidebars and bushings in adjacent bushing links, and are fixed in opposite outside sidebars, forming pin links, which alternate with bushing links.

Relative movement of the chain links occurs as relative rotation between the fixed bushings and the fixed pins. Wear occurring in the pins and bushings results in chain elongation. Excess wear and elongation require chain replacement. Lubrication of the pin-bushing interfaces increases chain life. Debris and abrasive dust in the pin-bushing rotation interfaces increase wear and decrease chain life.

Pin and bushing chains are lubricated with grease and are sealed to extend life of the chain by lubricating the pin-bushing interfaces, preventing egress of grease and preventing ingress of particles between the pins and bushings. Sealing the pin bushing interface reduces or prevents wear and extends useful chain life.

Sealing of the lubrication prevents outward migration of grease and inward migration of particles. Seals have been provided at ends of bushings between inside and outside sidebars. Some pins have grease fittings and channels to add lubricant.

Needs exist for improved seals.

SUMMARY OF THE INVENTION

In the present invention the lubricating bushing-pin interfaces are sealed in a novel way.

Internal annular grooves are formed in the bushings near their axial ends. Inside sidebars are assembled on two bushings. Ends of the bushings extend outward beyond the inside sidebars. Steel rings are assembled in the internal grooves near first ends of the bushings. Grease is added between the grooves. Steel rings are assembled in the grooves near the second ends of the bushings.

Pins from adjacent pin links are inserted through outside sidebars, inside sidebars, the bushings and the steel rings. The steel rings are frictionally engaged on the pins and rotate in the bushing internal grooves. Grease is prevented from leaking outward beyond the internal grooves and steel rings. The rings and grooves prevent ingress of dust and particles.

The internal grooves and rings are located near the ends of the bushings, so that long lines or areas of contact between bushings and pins are lubricated.

In an example the grooves are positioned in the bushings so that when the bushings are installed in the inside sidebars, the entire lengths of the bushings between and within the inside sidebars remain lubricated.

The steel rings may be spiral or helical to facilitate expansion of the rings into the grooves upon inserting the pins through the rings, while maintaining the sealing.

Annular rubber seals are provided on the ends of the bushings that extend from the inside sidebars. The rubber-like seals have small inner ends that grip the bushing extensions.

Sloping bodies of the rubber seals terminate outwardly in large radiused portions that contact inner surfaces of the outside sidebars near the pins fixed therein. The annular rubber-like seals keep contaminates away from the pins and from moving areas between the bushing ends and the outside sidebars.

These and further and other objects and features of the invention are apparent in the disclosure, which include the above and ongoing written specification, with the claims and the drawings.

DETAILED DESCRIPTION OF THE DRAWINGS

Figure 1:
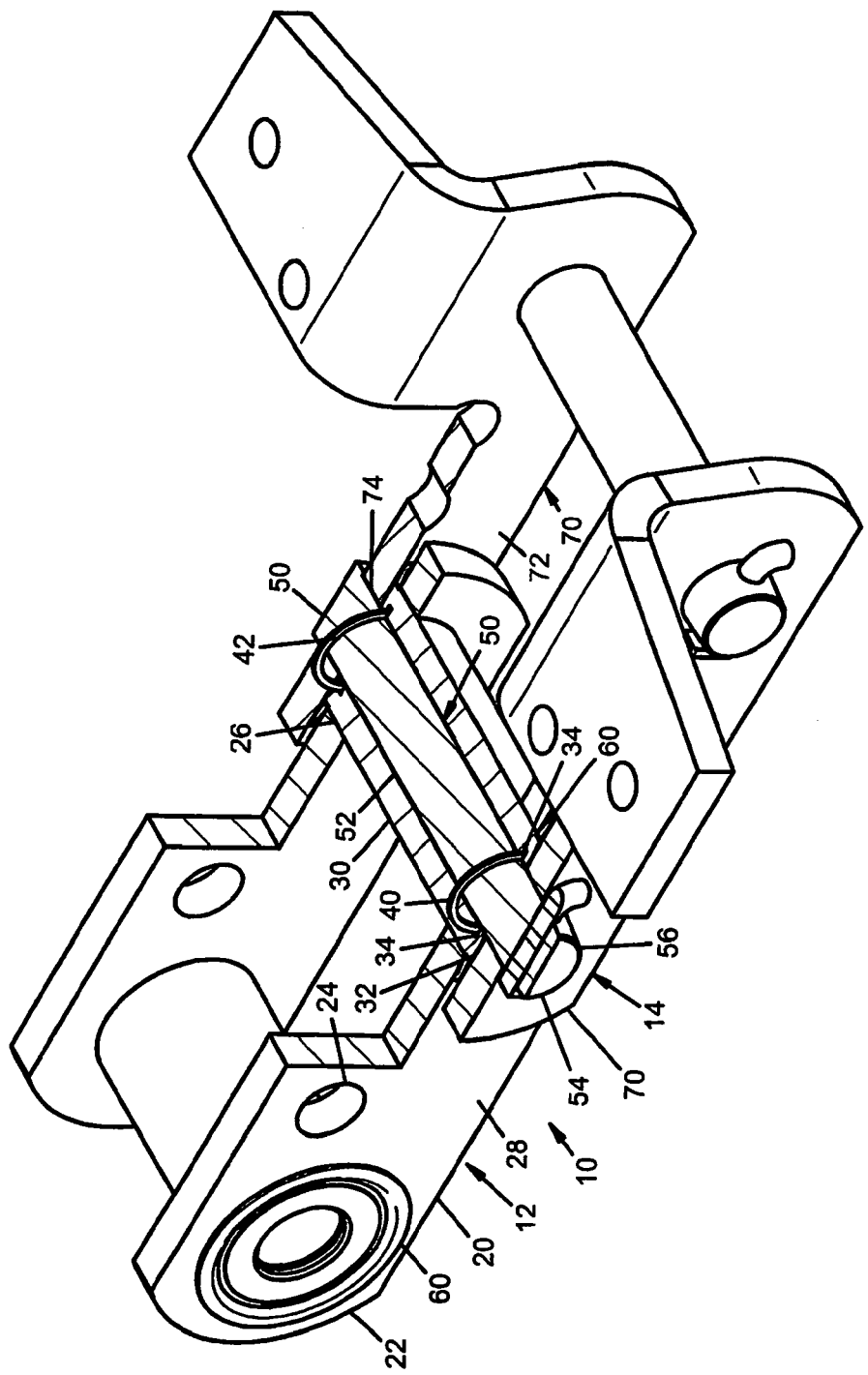
FIG. 1 is a partially cutaway view of chain links showing internal sealing rings and bushings with internal grooves, a pin and inside and outside sidebars in partial cross section.

FIG. 1 is a partially cutaway view of links in a chain 10 partially showing a bushing link 12, a pin link 14, internal sealing rings 40 and bushings 30, internal grooves 34, a pin 50, and inside and outside sidebars 20 and 70 and outer rubber-like seals 60 in partial cross section. The inside sidebars 20 have rounded ends 22 and openings 24 for weight and stress reduction and openings 26 near ends 22 for receiving bushings 30 in tight interference fit. Ends 32 of bushings 30 extend slightly beyond outer sides 28 of the inside side bars 20. The bushings 30 have internal grooves 34 spaced slightly inward from ends 32 of the bushings. The internal grooves 34 receive and hold steel internal sealing rings 40. The steel internal sealing rings 40 are expanded outward by insertion of the pins 50. Inner surfaces 42 of the steel rings grip outer surfaces 52 of the pins. Friction between surfaces 42 and 52 assures that the internal sealing rings 40 rotate with the pins 50. The internal sealing rings 40 have widths slightly less than widths of the grooves 34. When fitted on the pins 50, the internal sealing rings 40 have outer diameters slightly less than the larger diameters of the grooves 34. Sealing of the pin-bushing interfaces occurs by the small clearances between the internal sealing rings 40 and the grooves 34 as the rings rotate with the pins 50.

Figure 2:
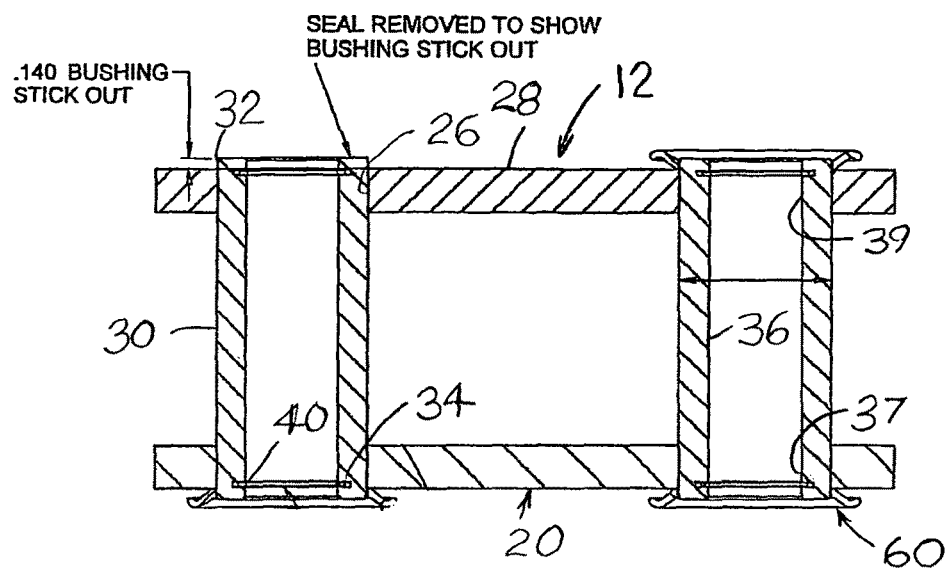
FIG. 2 is a cross section of bushings, internal grooves, internal steel sealing rings, inside sidebars and rubber seals.
Figure 3:
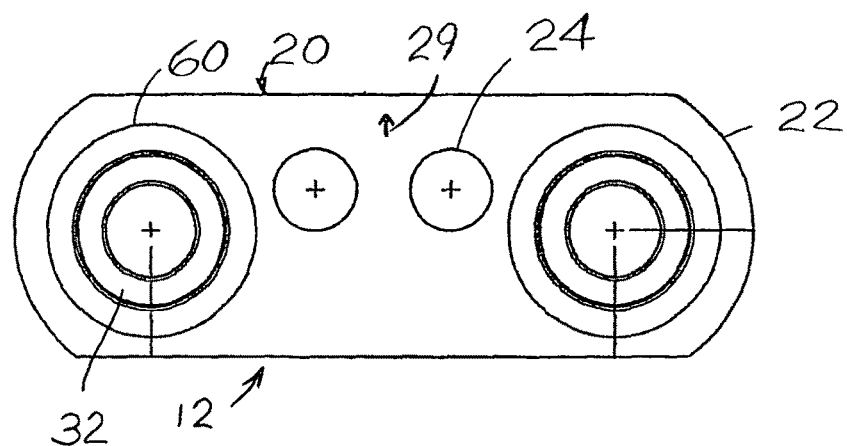
FIG. 3 is a side elevation of the bushing link shown in FIG. 2.

FIG. 2 is a cross section of a bushing link 12 or box, showing bushings 30, internal grooves 34, steel internal sealing rings 40 in the grooves, inside sidebars 20 and rubber-like seals 60 in cross section. FIG. 3 is a side elevation of the bushing link 12 shown in FIG. 2. The bushings 30 are first formed with internal grooves 34. The internally grooved bushings are interference fit in the openings 26 in inside sidebars 20. Ends 32 of the bushings 30 extend slightly outward from outside surfaces 28 of the inside sidebars 20.

Steel internal sealing rings 40 are compressed and inserted inside bushings 30, slid inward and released to expand in the internal grooves 34 in first ends 37 of the bushings. Grease is added to the inner surface 36 of the bushing between the grooves 34. Then steel internal sealing rings 40 are inserted in grooves 34 in the second ends 39 of the bushings 30.

As shown in FIG. 1 each pin 50 has a head end 52 held in an opening 74 in one outside sidebar 70. The pins have opposite ends 54 which are tapered 56 to slide through the sidebars, the bushings 30 and the steel internal sealing rings 40 which are held in the internal grooves 34 of the bushing. As the pins 50 slide through the steel internal sealing rings 40, the pins enlarge the rings, expanding them further into the grooves and causing the inner surfaces 42 of the rings to tightly grip outer surfaces 52 of the pins. The pins 50 and internal sealing rings 40 rotate together in the bushings 30 and grooves 34.

As shown in FIGS. 1-4 the nitrile rubber-like seals 60 have generally conical shapes with small collars 62 located on the bushing extensions. The seal bodies have cone shaped central portions 64 that terminate outwardly in large radiused outer portions 66. The large radiused outer portions bear against inner surfaces 72 of outside sidebars 70. The nitrile seals 60 prevent dirt and dust from collecting in the areas around the pins 50 between the bushing ends 32 and the outside sidebars 70. The internal sealing ring 40 seals to prevent any debris that passes the outer nitrile seals 60 from entering the main bearing surfaces between the bushings 30 and the pins 50.

The inner bushing links are assembled in the following steps. Grooves 34 are formed in the bushings 30. Inside sidebars 20 are assembled on bushings 30, leaving 0.140 inch of the bushings sticking out. The stamped sides of sidebar 20 face outward. Arrows 29 on both sidebars 20 point the same way. Ring seals are assembled in bushings 30. Two internal sealing rings 40 are assembled in first ends of the bushings 30 in block 12.

Grease is applied inside the bushings 30 between the ring grooves 34. Two internal sealing rings 40 are assembled in the second ends of the bushings 30 in the block 12. Rubber-like seals are assembled on extended ends, 32 of bushings 30. Be careful not to damage the internal sealing rings 40 as the pins 50 are pushed through the bushings 30.

Each steel internal sealing ring 40 fits into a groove 34 in a bushing 30 and clamps tightly on a pin 50. As the chain 10 articulates, the internal sealing ring 40 remains on the pin 50 and rotates in the groove 34. The internal sealing ring 40 seals to prevent debris from entering the areas between the pins 50 and bushings 30. Other sealed chains apply only face seals or labyrinth seals to the outsides of the bushings between the sidebars.

Figure 4:
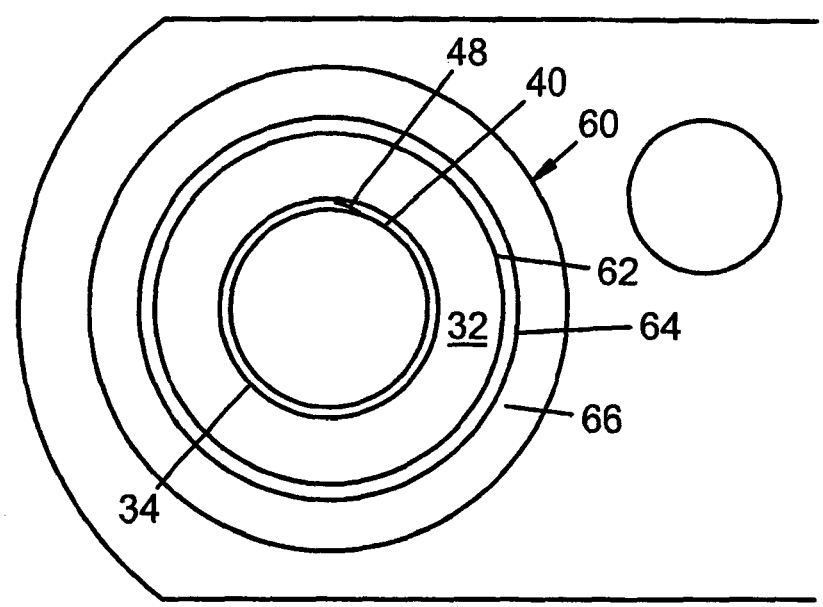
FIG. 4 is a perspective view of part of an inside sidebar, an end of a bushing, a sealing steel ring in a groove near the end of the bushing, a helical spring shape of the steel ring for expanding the ring and gripping a pin, and a rubber outer seal as shown in FIGS. 1-3.

FIG. 4 is a perspective view of a part of an inside sidebar 20, an end 32 of a bushing 30, an internal sealing ring 40 in a groove 34 near the end of the bushing 30. A spiral or helical shape 48 of the steel ring allows expanding the internal sealing ring 40 and gripping a pin 50. A rubber-like outer seal 60 is shown in FIGS. 1-4.

Figure 5:
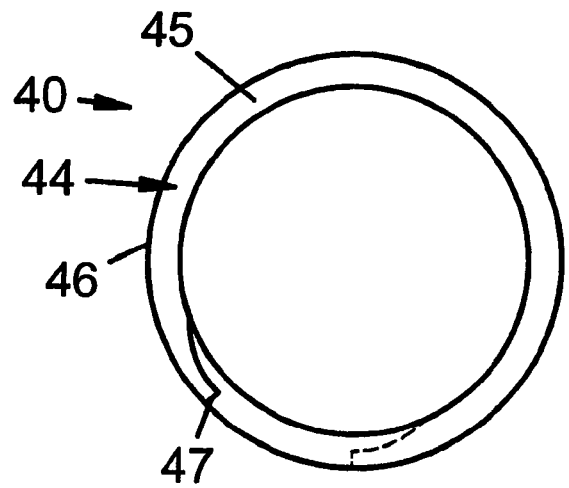
FIG. 5 is a perspective detail of a spring ring shown in FIGS. 1-4.
Figure 6:
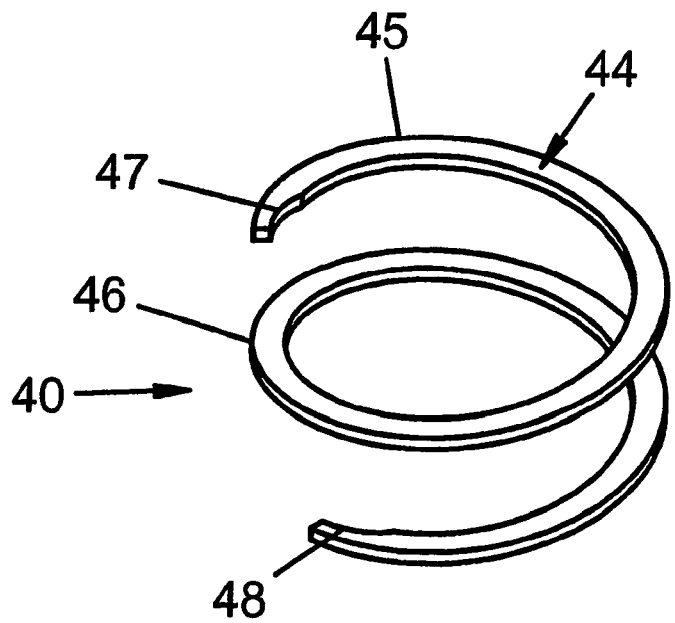
FIG. 6 is a perspective detail of one of the spring rings of FIGS. 1-5 shown held open to reveal its helical construction.

FIG. 5 is a perspective detail of the internal sealing ring 40 as a spring shown in FIGS. 1-4. FIG. 6 is a perspective detail of one of the internal sealing ring 40 springs in FIGS. 1-5 held open to reveal the helical construction. Steel internal sealing ring 40 is made of a continuous helix 44 which forms two overlapping layers 45 and 46. Spring internal sealing rings 40 are compressed diametrically before they are inserted inside bushings 30, which moves spring ends 47, 48 toward each other. When spring internal sealing rings 40 reach grooves 34 in the bushings, the springs expand to their original shape with ends 47, 48 moving away from each other. When pins 50 are inserted in the bushings 30, the spring internal sealing rings 40 are further expanded into the grooves 34 and tightly grip the pins 50. When the pins turn in the bushings, the springs of the internal sealing rings 40 turn with the pins.

While the invention has been described with reference to specific embodiments, modifications and variations of the invention may be constructed without departing from the scope of the invention which is defined in the following claims.

We claim:

1. Chain sealing apparatus comprising
   a chain,
   bushings in the chain, the bushing having opposite ends,
   internal annular grooves in the bushing near the opposite ends,
   internal sealing rings in the internal grooves,
   pins extending through the bushings and the rings and forming inside spaces between the bushings and pins within the rings,
   the rings sealing the inside spaces against intrusion of debris within the inside spaces,
   and wherein the internal sealing rings turn with the pins when the pins turn in the bushings.

2. The chain sealing apparatus of claim 1, further comprising:
   lubrication in the bushings between the annular grooves, and wherein the rings retain the lubrication between the bushings and pins within the inside spaces between the annular groves.

3. The chain sealing apparatus of claim 2, wherein the internal annular rings are stretched outward further into the grooves upon insertion of the pins, and the annular rings attach to the pins and relatively rotate in the grooves and block debris or lubricant movement along the pins past the rings.

4. The chain sealing apparatus of claim 3, wherein the internal annular rings are steel rings.

5. The chain sealing apparatus of claim 4, wherein the internal steel rings have helical shapes.

6. The apparatus of claim 1, further comprising inside sidebars connected to pairs of the bushings, forming bushing links and wherein the ends of the bushings extend slightly beyond outer surfaces of the inside sidebars, and further comprising outside sidebars connected to the pins.

7. The apparatus of claim 6, further comprising cone-shaped flexible, resilient outer seals having collars positioned around the extended ends of the bushings and against outer surfaces of the inside sidebars, outward sloping conical middle portions connected to the collars and outer radiused portions contacting inner surfaces the outside sidebars.

8. The apparatus of claim 6, wherein the internal annular grooves are aligned with the outer surfaces of the inside sidebars.

9. A method of sealing bushing and pin interfaces in chains comprising:
   providing bushings,
   providing annular internal grooves in the bushings,
   providing inside sidebars for holding the bushings,
   fixing the bushing in the inside sidebars,
   inserting internal sealing rings in the internal grooves,
   providing pins,
   providing outside sidebars for receiving the pins,
   inserting the pins through the outside sidebars, the inside sidebars, the bushings and the internal sealing rings and,
   fixing the pins in the outside sidebars.

10. The method of claim 9, further comprising:
    providing grease in the bushings between the annular internal grooves, and retaining the grease between the internal sealing rings.

11. The method of claim 9, further comprising:
    preventing debris from passing inward beyond the internal sealing rings.

12. The method of claim 9, further comprising enlarging the sealing rings in the grooves upon inserting the pins through the rings, connecting the rings on the pins and rotating the rings with the pins and in the grooves when the pins and bushings relatively rotate.

13. The method of claim 9, wherein the providing the rings comprises providing steel rings capable of compression.

14. The method of claim 9, further comprising aligning the internal grooves in the inside sidebars.

15. The method of claim 14, wherein the internal grooves are aligned with outer surfaces of the inside sidebars.

16. The method of claim 9, further comprising extending ends of the bushings beyond outer surfaces of the inside sidebars and placing outer flexible seals on the extended ends of the bushings before inserting the pins in the bushings.

17. The method of claim 16, wherein the providing of the outer flexible seals further comprises placing collars of the flexible seals on the ends of the bushings, extending conical central portions of the flexible seals at angles outward from the ends of the bushings to curved ends of the flexible seals and contacting the inner surfaces of the outside sidebars with the curved ends of the flexible seals.

18. The method of claim 16, wherein the outer flexible seals are nitrile seals.

19. A system for sealing bushings and pins on chains comprising:
    forming first and second internal annular grooves near first and second ends of the bushings,
    fixing the bushings in inside sidebars, with opposite ends of the bushings extending outward beyond the inside sidebars,
    inserting internal sealing rings in the first internal annular grooves,
    applying grease inside the bushings between the first and second internal annular grooves,
    inserting internal sealing rings in the second internal annular grooves,
    inserting pins through outside sidebars, the inside sidebars, the bushings and the internal sealing rings,
    expanding the internal sealing rings further into the internal annular grooves by the inserting the pins in the steel rings and tightly engaging the internal sealing rings on the pins for relative rotation of the rings in the grooves, wherein the internal sealing rings turn with the pins when the pins turn in the bushings, and
    preventing ingress of debris and egress of lubricant along the pins past the internal sealing rings.

20. The system of claim 19, further comprising providing outer nitrile seals, placing collars of the outer nitrile seals on the extended ends of the bushings before placing the outside sidebars and inserting the pins and contacting outer curved portions of the outer nitrile seals with inner surfaces of the outside sidebars when placing the outside sidebars and inserting the pins.

\* \* \* \* \*